(12) United States Patent
Park

(10) Patent No.: US 10,442,173 B2
(45) Date of Patent: Oct. 15, 2019

(54) APPARATUS AND METHOD FOR RECLAIMING CURVED AND BENDABLE DISPLAY SCREENS

(71) Applicant: Euna Park, Plano, TX (US)

(72) Inventor: Euna Park, Plano, TX (US)

(73) Assignee: Euna Park, Plano, TX (US)

( * ) Notice: Subject to any disclaimer, the term of this patent is extended or adjusted under 35 U.S.C. 154(b) by 0 days.

(21) Appl. No.: 16/036,610

(22) Filed: Jul. 16, 2018

(65) Prior Publication Data
US 2018/0319149 A1 Nov. 8, 2018

Related U.S. Application Data

(63) Continuation-in-part of application No. 14/701,970, filed on May 1, 2015, now Pat. No. 10,052,859.

(51) Int. Cl.
B32B 43/00 (2006.01)
B32B 38/10 (2006.01)
B32B 38/00 (2006.01)

(52) U.S. Cl.
CPC ............ *B32B 43/006* (2013.01); *B32B 38/10* (2013.01); *B32B 2038/0076* (2013.01); *B32B 2309/027* (2013.01); *B32B 2457/208* (2013.01); *Y10S 156/93* (2013.01); *Y10T 156/1153* (2015.01); *Y10T 156/1911* (2015.01)

(58) Field of Classification Search
CPC . B32B 38/10; B32B 43/006; Y10T 156/1153; Y10T 156/1911; Y10S 156/93; Y10S 156/941
USPC ................ 156/711, 752, 924, 937
See application file for complete search history.

(56) References Cited

U.S. PATENT DOCUMENTS

| | | | |
|---|---|---|---|
| 2011/0180218 A1* | 7/2011 | Ciliberti | G02F 1/1303 156/705 |
| 2012/0263956 A1* | 10/2012 | Watanabe | G02F 1/133502 428/423.1 |
| 2014/0141547 A1* | 5/2014 | Kim | H01L 51/56 438/26 |
| 2016/0300881 A1* | 10/2016 | Bouvier | H01L 27/153 |

* cited by examiner

*Primary Examiner* — Mark A Osele
*Assistant Examiner* — Nickolas R Harm
(74) *Attorney, Agent, or Firm* — Sul Lee

(57) ABSTRACT

A technique for protecting a portion of a screen panel during a process for disassembling and servicing a display screen device is provided. A first part of the display screen device is separated from a screen panel part of the display screen device, where the screen panel part includes a main screen portion and a circuit of flexible printable circuit board (FPCB) portion. An encapsulant is applied onto a break protectable layer (BPL) of the circuit of flexible printable circuit board (FPCB) portion. The screen panel part is washed, with a solvent to remove residue from the main screen portion.

6 Claims, 9 Drawing Sheets

APPARATUS AND METHOD FOR RECLAIMING CURVED AND BENDABLE DISPLAY SCREENS

CROSS-REFERENCE TO RELATED APPLICATION

This Application is a continuation of U.S. application Ser. No. 14/701,970 filed May 1, 2015. The disclosures of these applications including the specifications, the drawings and the claims are hereby incorporated by reference in their entirety.

TECHNICAL FIELD

The present application relates generally to an apparatus and method for disassembling a curved or bendable display screen during repair of the display screen.

BACKGROUND

The high cost of many smartphones makes it economically viable to repair a damaged smartphone rather than replace it. While a consumer might well throw away an inexpensive cellphone if the screen cracked after being dropped, the consumer will instead repair an expensive smartphone. As a result, there is a substantial market for replacing cracked screens and other parts of smartphones.

One common method of separating the parts of a smartphone uses liquid nitrogen ($N_2$) that is poured on the screen of the smartphone. The top glass layer of a smart phone is typically adhered to the layers of the touch screen below it by means of a layer of optical clear adhesive. After a few seconds of the liquid nitrogen resting on the surface of the glass, the optical clear adhesive freezes and loses its adhesive properties. A simple tap on the glass is then sufficient to separate the glass layer from the touch screen components.

Recently, however, curved screens and bendable screens have entered the smartphone marketplace. The surface glass of these devices is not flat and the components and materials for the display assembly are significantly different than those in flat screen displays. Also, removing these screens is further complicated because the liquid nitrogen will simply run off the curved surface of the glass.

After the touch screen components are separated from the glass, the touch screen components are then washed to remove residue from the main portion of the touchscreen. Typically, a solvent is used during this washing process. However, one problem that occurs is that the washing process inadvertently removes all or a portion of a resin layer that protects a circuit layer that resides along the periphery of the main portion of the touchscreen.

Therefore, there is a need for improved techniques for repairing the curved and/or flexible screens of a smartphone. There is a further need for a device that will optimize the environment and conditions in using liquid nitrogen that will prevent defects when the temperature is very low and the surface screen is being separated. There is still a further need to protect the resin layer.

SUMMARY

To address the above-discussed deficiencies of the prior art and to develop technologies that are compatible to the new display changes, a method of disassembling a display screen device while protecting portions covered by the resin is provided. The method includes separating a first part of the display screen device from a screen panel part of the display screen device, the screen panel part comprising a main screen portion and a circuit of flexible printable circuit board (FPCB) portion; applying an encapsulate on a break protectable layer (BPL) of the circuit of FPCB portion; and washing the screen panel part with a solvent to remove residue from the main screen portion.

According to an embodiment, the encapsulant is a flowable silicone encapsulant with dielectric properties that are appropriate for protecting a circuit layer in the circuit of FPCB portion.

According to an embodiment, the encapsulant is curable at room temperature.

According to an embodiment, the first part of the display screen device is a cover glass.

According to an embodiment, separating the first part of the display screen device from the screen panel part is performed in a partial cooling chamber.

According to an embodiment, the screen panel part is removed from the partial cooling chamber prior to applying the encapsulant on the BPL.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus for repairing display screens.

The present disclosure describes a technique that uses very cold nitrogen ($N_2$) gas in place of liquid nitrogen to freeze and separate the components of any electronic device that uses adhesives to attach component layers. Such electronic devices may include a smartphone, including a touch screen of a smartphone device.

Figure 1:
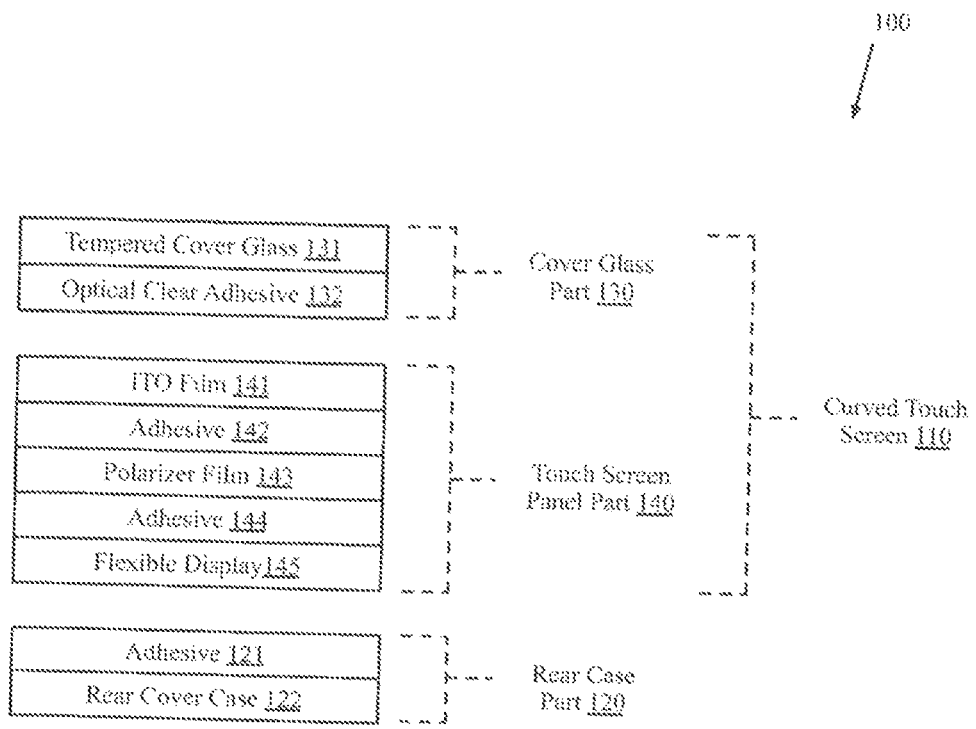
FIG. 1 illustrates a conventional touch screen device according to an embodiment of the disclosure.

FIG. 1 illustrates conventional touch screen device 100 according to an embodiment of the disclosure. Device 100 comprises curve touch screen part 110 and rear case part 120. Curved touch screen part 110 comprises cover glass part 130 and touch screen panel part 140. Rear case part 120 comprises adhesive layer 121 and rear cover case 122. Cover glass part 130 comprises tempered cover glass 131 and optical clear adhesive layer 132. Touch screen panel part 140 comprises indium tin oxide (ITO) film 141, adhesive layer 142, polarizer film layer 143, adhesive layer 144, and flexible display 145. Other embodiments may have fewer layers, different arrangements of layers, and/or layers that are not illustrated in FIG. 1. According to an embodiment, a portion of the touch screen panel part 140 may have additional layers.

Optical clear adhesive layer 132 is a clear adhesive that attaches tempered cover glass 131 to ITO film layer 141. At normal environmental temperatures, the adhesive properties of optical clear adhesive layer 132 are strong. However, at very low temperatures, the adhesiveness of optical clear adhesive layer 132 greatly diminishes and a slight tap can separate tempered cover glass 131 from ITO film layer 141. Similarly, adhesive layer 121 attaches rear cover case 122 to the back surface of flexible display 145. At very low temperatures, the adhesiveness of adhesive layer 121 greatly diminishes and a slight tap can separate rear cover case 122 from flexible display 145.

Figure 2:
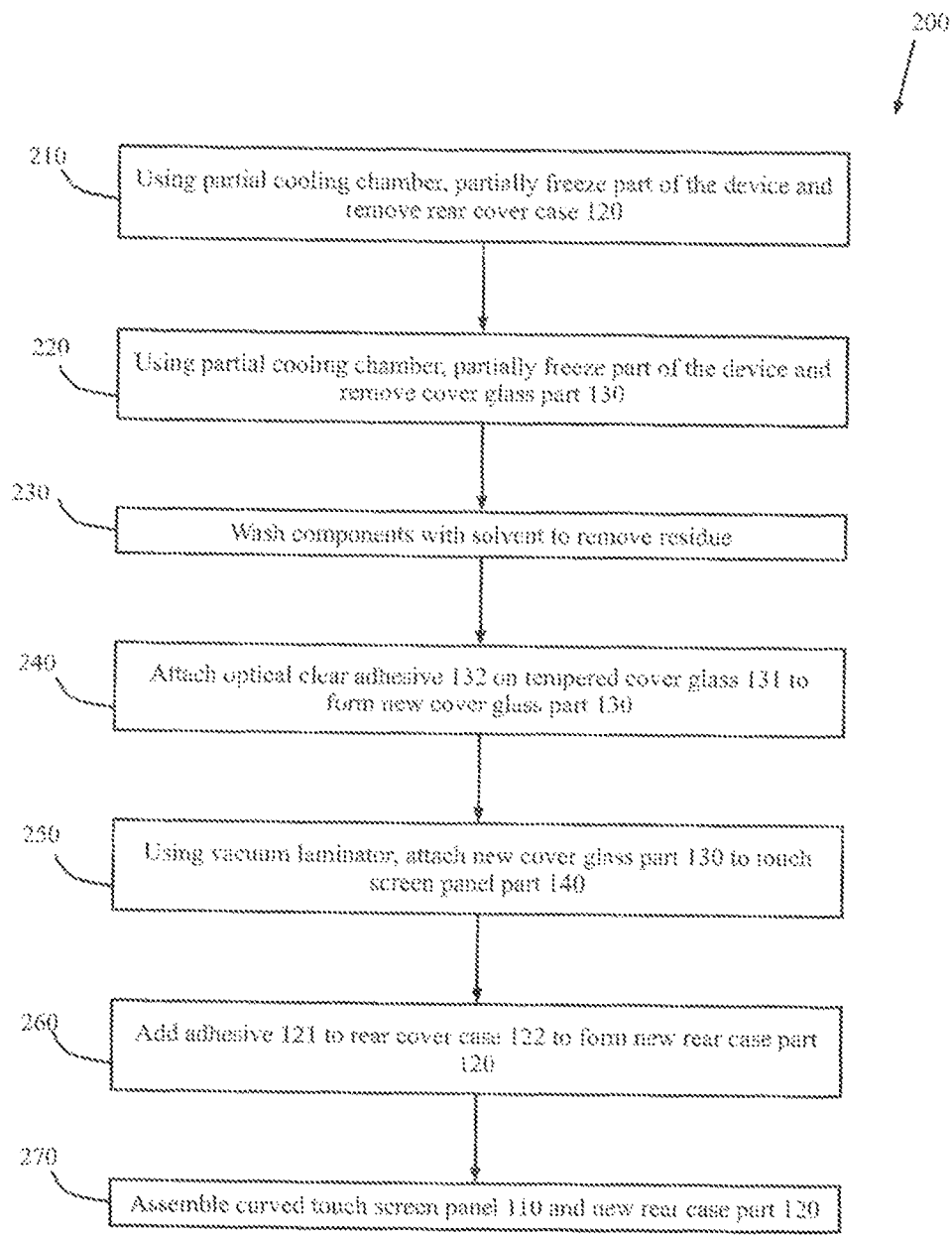
FIG. 2 is a flow diagram illustrating a process for separating parts of a touch screen device according to an embodiment of the disclosure.

FIG. 2 depicts flow diagram 200, which illustrates a process for separating parts of touch screen device 100 according to an embodiment of the disclosure. A partial cooling chamber as disclosed in FIGS. 3-5 may be used to perform the process in FIG. 2. Initially, rear cover case 122 is removed using a partial cooling chamber that partially freezes part of device 100 (e.g., the outer surface of rear cover ease 122) (step 210). Next, using the partial cooling chamber, cover glass part 130 is removed by partially freezing part of device 100 (e.g., outer surface of tempered cover glass 131 (step 220). At this point, both cover glass part 130 and rear case part 120 have been removed from touch screen panel part 140. Next, the separated components may be washed in a solvent to remove unwanted residue from the steps above (step 230). In an advantageous embodiment, the solvent used may be ISOPAR G fluid, which is available from ExxonMobil Chemical Company. ISOPAR G fluid comprises C9-11 isoalkanes (70%) and C10-13 isoalkanes (30%).

Next, device 100 may be reassembled using new replacement parts. A new layer of optical clear adhesive layer 132 is deposited on tempered cover glass 131 to form new cover glass part 130 (step 240). Using a vacuum laminator, new/repaired cover glass part 130 is attached to touch screen panel part 140 (step 250). Next, new adhesive layer 121 is added to rear cover case 122 to form new/repaired rear case part 120 (step 260). Thereafter, curved touch screen panel 110 and new rear case part 120 are assembled to form a repaired touch screen device 100 (step 270).

Figure 3:
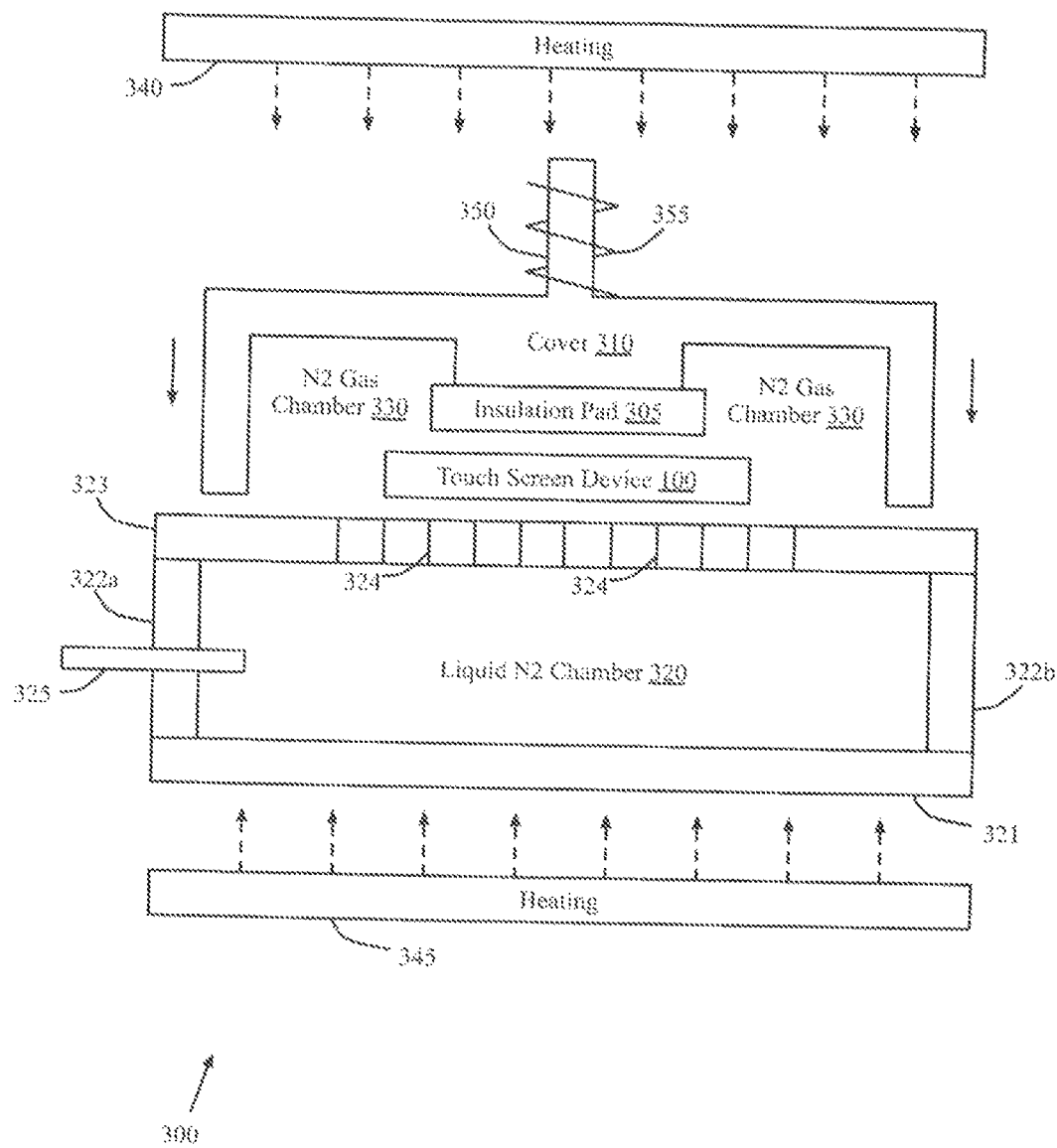
FIG. 3 illustrates an apparatus for separating the rear case part of a touch screen device according to an embodiment of the disclosure.

FIG. 3 illustrates a cross-sectional view of apparatus 300 for separating parts of touch screen device 100 according to an embodiment of the disclosure. Apparatus 300 comprises cover 310, bottom wall 321, sidewalls 322a and 322b, top wall 323, and heating elements 340 and 345. Bottom wall 321, sidewalls 322a and 322b, and top wall 323 define liquid nitrogen chamber 320. Liquid nitrogen is introduced into chamber 320 by hose 325. The liquid nitrogen evaporates into nitrogen gas as heating elements 340 and 345 warm the ambient air outside of chamber 320. The frigid nitrogen gas escapes from chamber 320 through vent holes 324 in top wall 323.

Touch screen device 100 is positioned above top wall 323 and underneath cover 310. When cover 310 is lowered by means of drive rod 350 and spring 355 (or other mechanical means), cover 310 forms a seal with the periphery of top wall 323 and creates nitrogen gas chamber 330 between cover 310 and top wall 323. The cold nitrogen gas escaping through vent holes 324 then fills nitrogen gas chamber 330 and freezes the exposed surfaces of touch screen device 100. When cover 310 is lowered, cover 310 also presses insulation pad 305 into contact with the upper surface of touch screen device 100, thereby protecting the region of touch screen device beneath insulation pad 305 from being frozen by the nitrogen gas.

Figure 4:
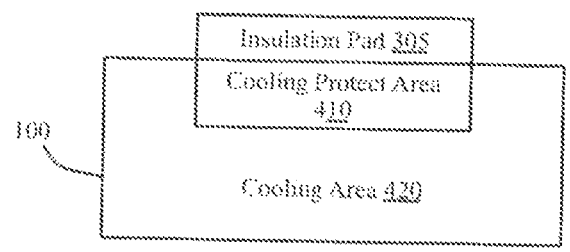
FIG. 4 is a detailed view of a portion of the apparatus in FIG. 3 according to an embodiment of the disclosure.

FIG. 4 is a detailed view of a portion of the apparatus in FIG. 3 according to an embodiment of the disclosure. Insulation pad 305 is pressed into contact with the upper surface of touch screen-device 100. As nitrogen gas cools the exterior of device 100, insulation pad 305 creates cooling protect area 410 that remains warmer than the rest of the body of device 100 (i.e., cooling area 420. Thus, any adhesive layer that is in cooling protect area 410 will remain relatively warm and retain its adhesive properties, while any adhesive layer that is in cooling area 420 will loses its adhesiveness.

In an exemplary embodiment, cooling protect area 410 may be cooled to between 0° C. and −30° C. and cooling area 420 may be cooled to between −40° C. and −80° C. Due to its thinness, tempered cover glass 131 may be cooled for between 7 seconds and 35 seconds. Rear case part 120 may be cooled for between 35 seconds and 70 seconds. For a small apparatus 300 or 500 that is sufficient in size to hold a smartphone, approximately 200-400 milliliters of liquid nitrogen may be used.

Figure 5:
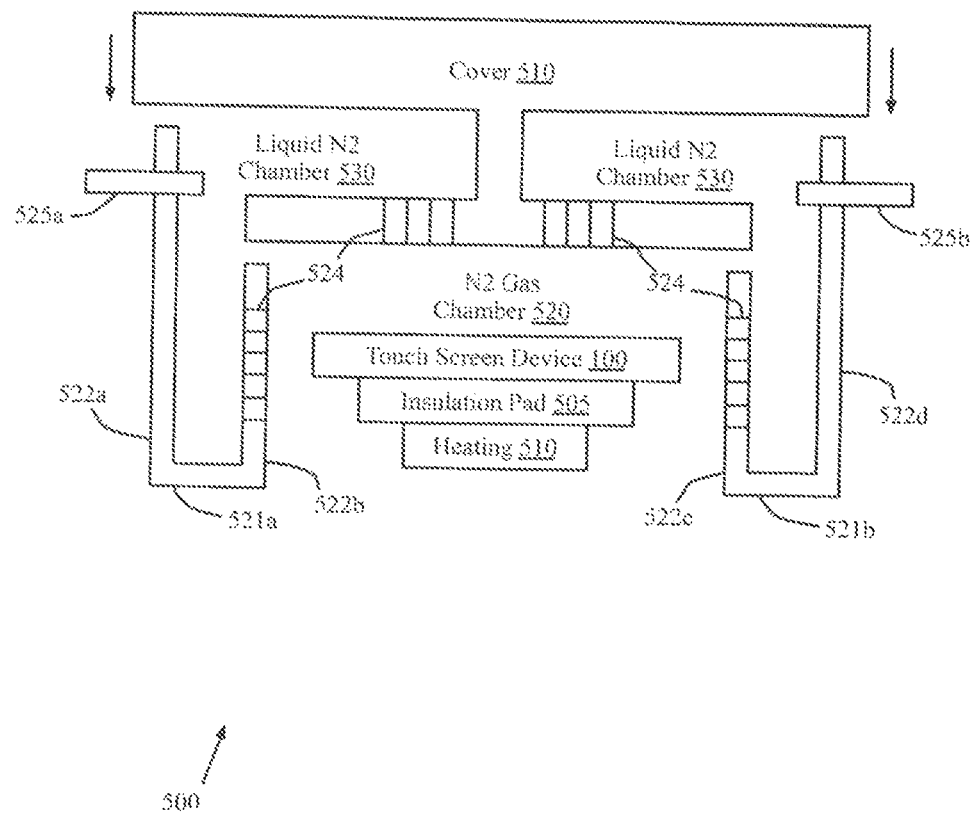
FIG. 5 illustrates an apparatus for separating the cover glass part of a touch screen device according to another embodiment of the disclosure.

FIG. 5 illustrates a cross-sectional view of apparatus 500 for separating parts of touch screen device 100 according to another embodiment of the disclosure. Apparatus 500 comprises cover 510, bottom walls 521a and 521b, sidewalls 522a, 522b, 522e, and 522d, and heating element 510. Bottom walls 521a and 521b, and sidewalls 522a-522d, and cover 510 define liquid nitrogen chamber 530. Liquid nitrogen is introduced into chamber 530 by hoses 525a and 525b. The liquid nitrogen evaporates into nitrogen gas as heating element 510 and other heating elements (not shown) warm the ambient air outside of chamber 530. The frigid nitrogen gas escapes from chamber 530 through vent holes 524 in cover 510. The hoses 525a and 525b are shown passing through the sidewalls 5222a and 522d. In an alternate embodiment, one or both of hoses 525a and 525d may pass through cover 510.

Touch screen device 100 is positioned below cover 510 and above the surface (not shown) on which apparatus 500 rests. When cover 510 is lowered by mechanical means (not shown), cover 510 forms a seal with the top edges of side wall 522a-522d and creates liquid nitrogen gas chamber 530. Lowering cover 510 also creates nitrogen gas chamber 520 between cover 510 and the surface on which apparatus 500 rests. The cold nitrogen gas escaping through vent holes 524 then fills nitrogen gas chamber 530 and freezes the exposed surfaces of touch screen device 100. Touch screen device 100 rests on insulation pad 505, thereby protecting the region of touch screen device above insulation pad 505 from being frozen by the nitrogen gas. This protected region is similar to cooling protect area 410 in FIG. 4.

Advantageously, either one of apparatus 300 and apparatus 500 may be used to perform the repair process in FIG. 2. In either case, nitrogen gas surrounds and freezes the exposed surfaces of touch screen device 100 to thereby create a cooling area 420 within the body of device 100. An adhesive layer within the cooling area 420 will lose its adhesive properties, so that components that are attached to each other by such a frozen adhesive layer are easily separated by tapping. In contrast, an adhesive layer within cooling protect area 410 retains its adhesiveness, so that components that are attached by such an adhesive layer will not separate by tapping.

Liquid nitrogen is usually at a temperature of around −195° Celsius and as it becomes gaseous nitrogen in the gas chamber, the temperature of the nitrogen slowly increases. A good temperature to separate the screen is approximately around −147° Celsius. Because the temperature of the nitrogen increases, it is important to create a short pathway to change from liquid state to gaseous state so that the chamber may maintain approximately −147° Celsius to separate the screen. Using gaseous nitrogen uses a smaller amount of nitrogen comparing to directly applying liquid nitrogen to a display screen device. In addition, by using a gas chamber, the gaseous nitrogen may be more evenly distributed than by directly applying liquid nitrogen.

Figure 6A:
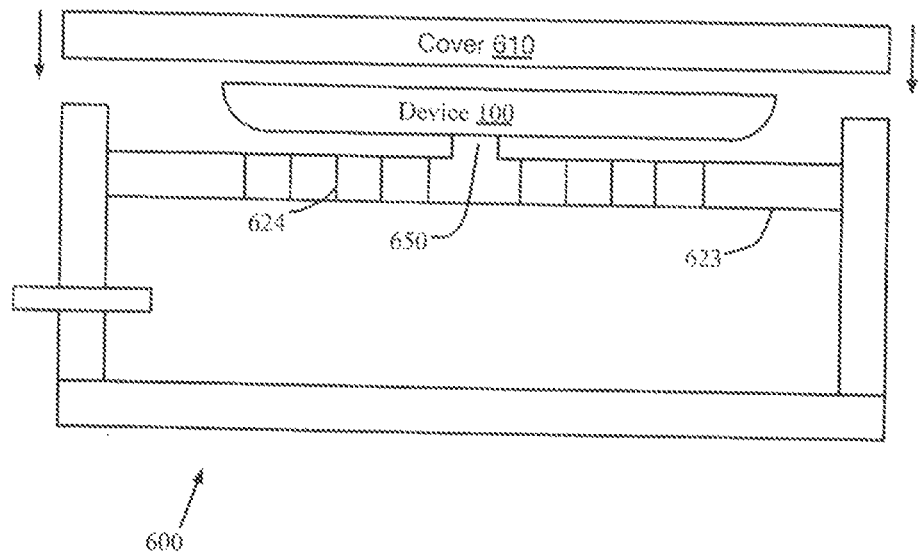
FIG. 6A and FIG. 6B illustrate a detailed view of a portion of an apparatus similar to the apparatus in FIG. 3 according to an alternate embodiment of the disclosure.
Figure 6B:
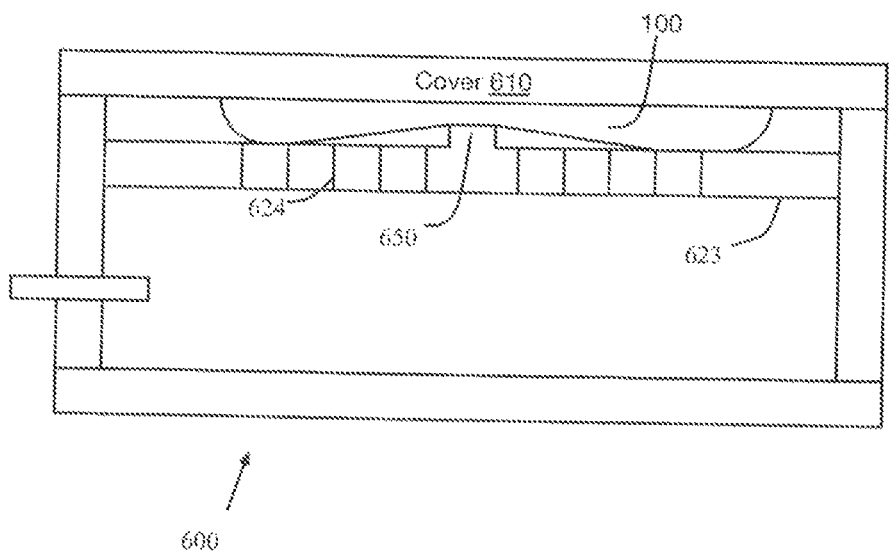

FIGS. 6A and 6B illustrate a detailed view of a portion of apparatus 600, which is similar to apparatus 300 in FIG. 3 according to an alternate embodiment of the disclosure. Those skilled in the art will understand in another alternate embodiment, apparatus 600 may be implement as a modification to apparatus 500 in FIG. 5. For simplification, many of the components in FIG. 3 have been omitted in FIG. 6 as they are not necessary to explain the operation of apparatus 600.

As in the previous embodiments, apparatus 600 comprises top wall 623, which includes a plurality of vent holes 624. Top wall 623 further includes protrusion 650 on the surface of top wall 623 that faces touch screen device 100. Profusion 650 may be a simple bump or ridge on top wall 623. In FIGS. 6A and 6B, it should be understood that device 100 and protrusion 650 are not intended to be shown to scale. In FIGS. 6A and 6B, cover 610 may represent both a cover and an insulation pad as in the previous embodiments in FIGS. 3 and 5.

In FIG. 6A, cover 610 has not yet been pressed downward (as indicated by arrows) on device 100. Device 100 includes a bendable screen, that is substantially flat prior to cover 610 being pressed, downward. In FIG. 6B, however, cover 610 has been pressed down onto device 100, thereby pressing device 100 onto protrusion 650. The effect is to bend the screen of device 100 as shown in FIG. 6B (bending not to scale). This bending by protrusion 650 causes the touch screen panel part 140 to more easily separate from the other parts of device 100.

Figure 7:
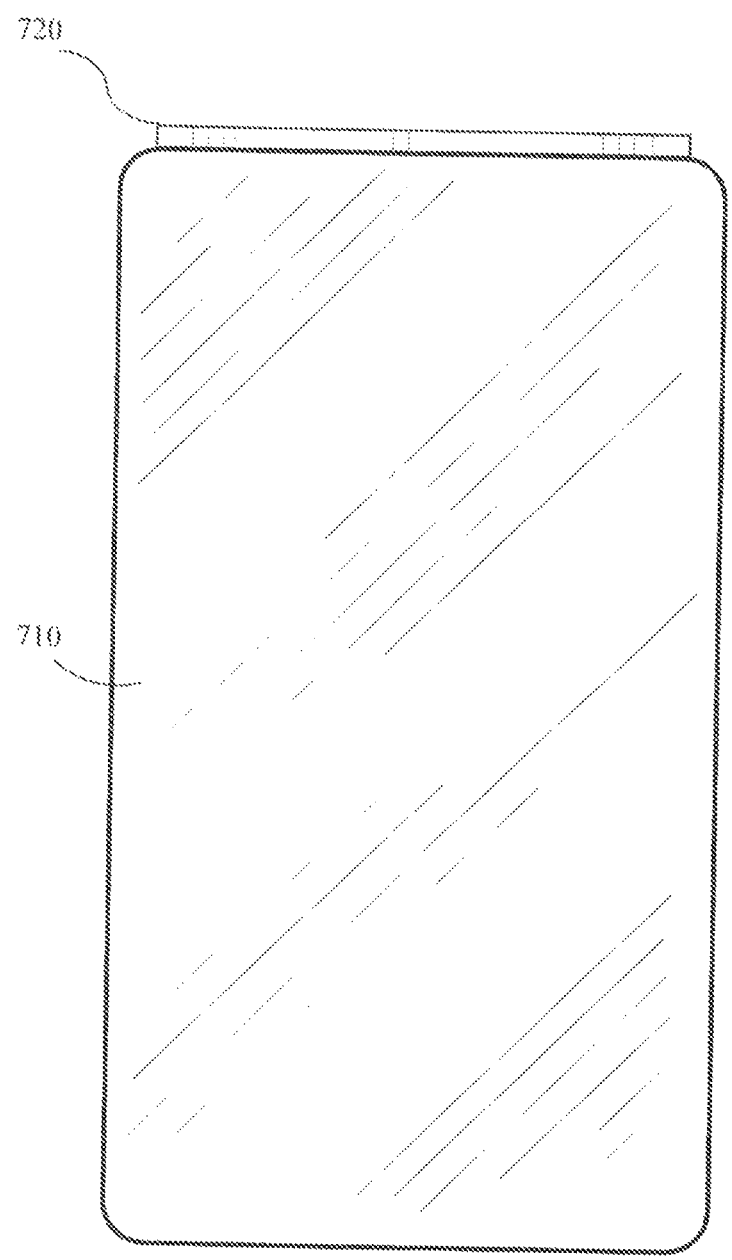
FIG. 7 illustrates a touchscreen panel part, according to an embodiment of the disclosure.

According to an embodiment, an encapsulant is applied after the cover glass part 130 is removed from the touch screen panel part 140. FIG. 7 illustrates a main touch screen portion 710 (which includes the flexible display 145) and a COF (circuit of flexible printable circuit board (FPCB)) or sometimes referred as COG (Circuit of Glass) portion 720 extending from the main touch screen portion. According to an embodiment, the layer structure illustrated for the main touch screen panel part 140 in FIG. 1 is representative of the cross section of the main touch screen portion 710.

Figure 9:
FIG. 9 illustrates a cross-section of a circuit of flexible printable circuit board (FPCB) portion, according to an embodiment of the disclosure.

FIG. 9 is a cross-sectional view of the COF portion 720, according to an embodiment of the present disclosure. The break protectable layer (BPL) 930 is at the top of the COF portion 720 and feces the cover glass part 130 of the touch screen device 100. Circuit layer 920, which includes electronic circuitry, is above the touch screen panel pan 140 (which is extended from the main touch screen portion 710 and feces the rear case part 120), and the BPL 930 is a protective layer over the circuit layer 920. According to an embodiment, during manufacture of the touch screen device 100, a break protectable layer (BPL) resin is solidified and UV-cured to the COF to form the BPL 930. According to an embodiment, the COF portion 720 includes an interface for connecting to additional circuitry (e.g. flexible printed circuit board) or other internal components in the touch screen device 100.

As previously discussed and illustrated in FIG. 2, after the touch screen panel part 140 has been separated from the cover glass part 130 and the rear case part 120 (i.e. after step 220), the touch screen panel part 140 is washed in a solvent to remove unwanted residue (step 230). One problem is that washing the touch screen panel part 140 may remove some or all of the BPL 930, thereby exposing the circuit layer 920 to impurities and losing integrity.

Figure 8:
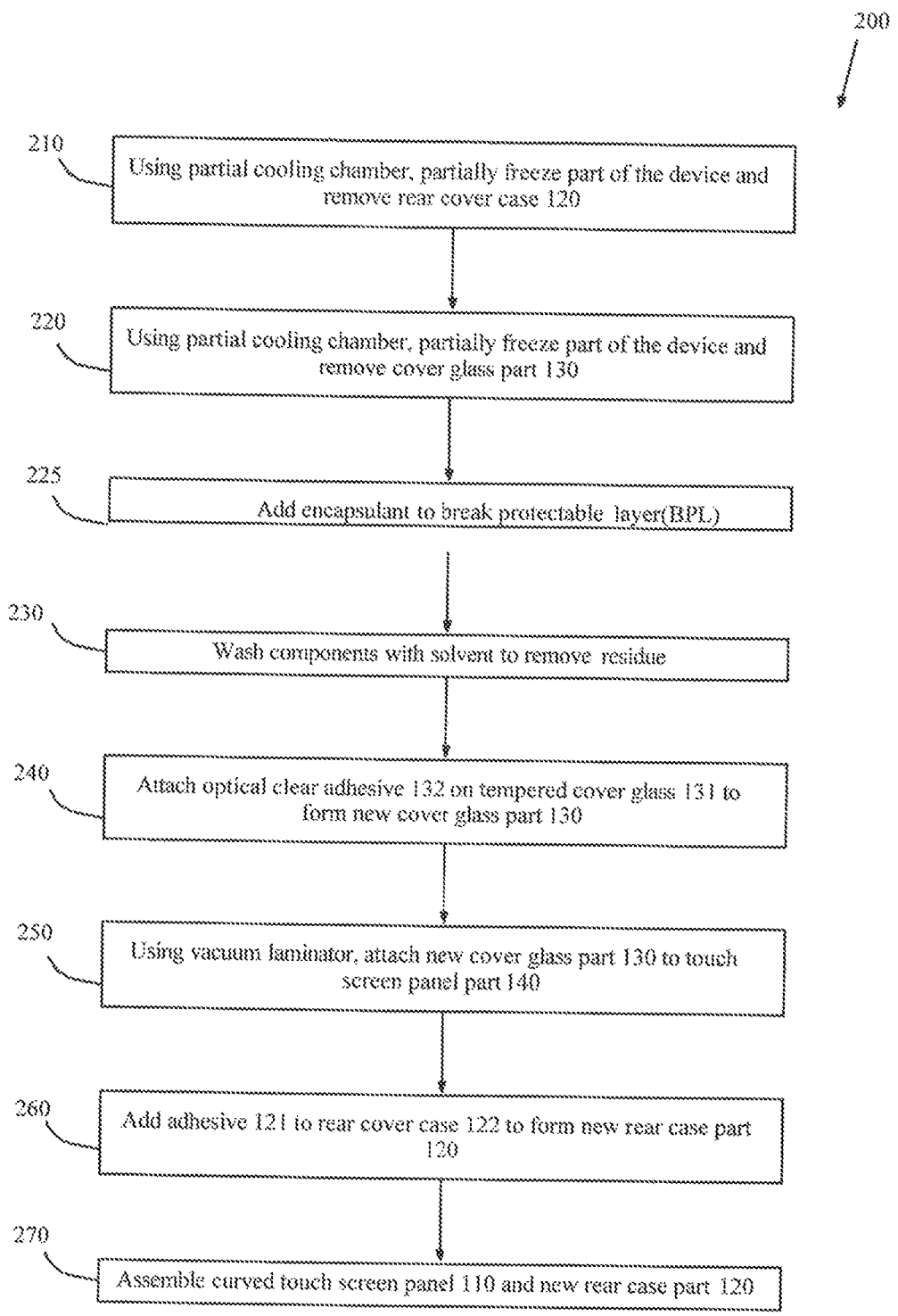
FIG. 8 illustrates a flow diagram illustrating a process for separating parts of a touch screen device similar to FIG. 2 but with an added step for applying an encapsulate to protect BPL, according to an embodiment of the disclosure.

FIG. 8 illustrates a process, according to an embodiment, to address this problem. The process illustrated in FIG. 8 is very similar to the process in FIG. 2, as indicated by the same numerals. In addition, at step 225, after the touch screen panel part is removed from the partial cooling chamber, an encapsulant is applied to cover the BPL 930 prior to washing the touch screen panel part 140 to address this problem. Step 225 is performed between step 220 (removing the cover glass part 130) and step 230 (washing the components to remove residue). The encapsulant may be of any composition that is effective for protecting the BPL 930 from getting washed away by the solvent in step 230. According to an embodiment, the encapsulant may be applied to cover all exposed sides/surfaces of the COF portion 720. According to an embodiment, the encapsulant is a composition that is water proof.

According to an embodiment, the encapsulant is a flowable silicone encapsulant with dielectric properties that is appropriate for protecting the circuit layer. According to an embodiment, an encapsulant that can be cured in room temperature may be used. According to an embodiment, an encapsulant that is waterproof may be used.

Figure 10:
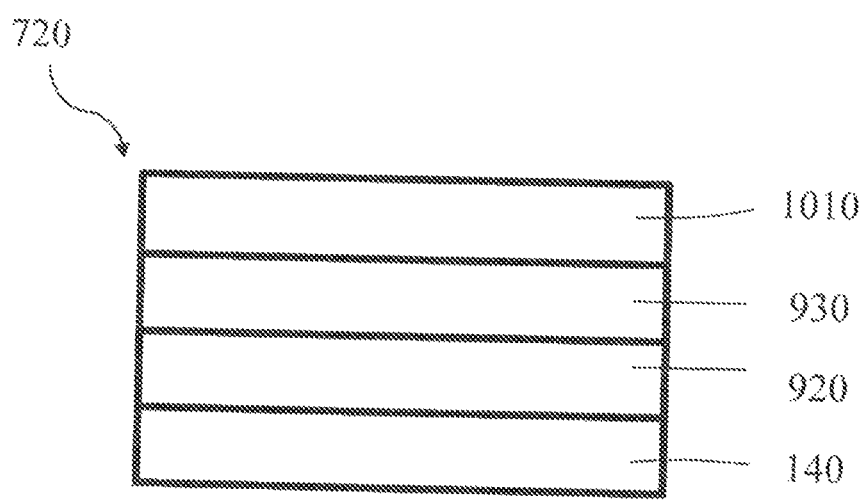
FIG. 10 illustrates a cross-section of a circuit of flexible printable circuit board (FPCB) portion after an encapsulant is applied, according to an embodiment of the disclosure.

By applying the encapsulant, the BPL 930 is preserved through the washing step 230, thereby keeping the circuit layer 920 protected through the process in FIG. 8. FIG. 10 illustrates the BPL after the encapsulant is applied on the BPL 930 to form an encapsulant layer 1010 that protects the BPL 930. According to an embodiment, the encapsulant may be applied to cover more than just the BPL 930. For example, the encapsulant layer 1010 may be formed over all exposed sides/surfaces of the COF portion 720 (i.e. such that an additional encapsulant layer is formed to be below the touch screen panel part 140 at the COF portion 720 in FIG. 10.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of disassembling a display screen device comprising: separating a first part of the display screen device from a screen panel part of the display screen device, the screen panel part comprising a main screen portion and a circuit of flexible printable circuit board (FPCB) portion;
applying an encapsulant on a break protectable layer (BPL) of the circuit of FPCB portion; and
washing the screen panel part with a solvent to remove residue from the main screen portion.

2. The method as set forth in claim 1, wherein the encapsulant is a flowable silicone encapsulant for protecting the BPL from being removed by the solvent.

3. The method as set forth in claim 1, wherein the encapsulant is curable at room temperature.

4. The method as set forth in claim 1, wherein the first part of the display screen comprises a cover glass.

5. The method as set forth in claim 1 wherein separating the first part of the display screen device from the screen panel part is performed in a partial cooling chamber.

6. The method as set forth in claim 5, further comprising removing the screen panel part from the partial cooling chamber prior to applying the encapsulant on the BPL.

* * * * *